(12) United States Patent
Evans et al.

(10) Patent No.: US 6,260,386 B1
(45) Date of Patent: Jul. 17, 2001

(54) OPTICAL FIBER PREFORM CLEANING METHOD

(75) Inventors: Jeffrey Jonathan Evans, Milltown, NJ (US); Siu-Ping Hong, Alpharetta, GA (US); Urmi Ray, Plainsboro, NJ (US); Trudy Murrell Thiele, Lawrenceville, GA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 08/208,557

(22) Filed: Mar. 10, 1994

(51) Int. Cl.[7] .................................................. C03B 37/00
(52) U.S. Cl. ................... 65/378; 65/503; 134/6; 134/7; 134/12; 356/73.1
(58) Field of Search ................... 134/6, 7, 12; 356/73.1; 65/378, 503

(56) References Cited

U.S. PATENT DOCUMENTS

| | | | |
|---|---|---|---|
| 4,450,333 | 5/1984 | Andrejco et al. | 219/10.49 |
| 4,492,463 * | 1/1985 | Marcuse | 356/73.1 |
| 4,565,449 * | 1/1986 | Grego | 356/73.1 |
| 4,726,677 * | 2/1988 | Glantschnig | 356/73.1 |
| 4,822,429 * | 4/1989 | McCord | 134/12 |
| 4,934,818 | 6/1990 | Glantschnig et al. | 356/73.1 |
| 5,076,824 | 12/1991 | Miller | 65/3.12 |
| 5,339,844 * | 8/1994 | Stanford | 134/107 |
| 5,355,901 * | 10/1994 | Mielnik | 134/105 |

OTHER PUBLICATIONS

*Concise Encyclopedia of Chemical Technology.* Kirk–Othmer 1985, Wiley & Sons, pp. 1141–1142.*

"Supercritical Fluids to Replace VOC Cleaning Media", by J. Williams et al., Environmentally Conscious Manufacturing Conference, Albuquerque, NM, Sep. 18–20, 1991.

"Processing of Polymers with Supercritical Fluids," V. Krukonis, *Polymer News*, vol. 11, 1985, pp. 7–16.

* cited by examiner

Primary Examiner—John Hoffmann
(74) Attorney, Agent, or Firm—Bruce S. Schneider

(57) ABSTRACT

Glass preforms are cleaned by contacting each preform (11) with supercritical carbon dioxide which dissolves residual index-matching oil on the preform. The liquefied carbon dioxide is then converted to gaseous carbon dioxide which conveniently separates the index-matching oil so that it can be recovered and reused. The gaseous carbon dioxide is likewise recycled for use in cleaning other preforms, and so there is substantially no waste.

3 Claims, 1 Drawing Sheet

OPTICAL FIBER PREFORM CLEANING METHOD

TECHNICAL FIELD

This invention relates to the cleaning of optical fiber preforms and, more particularly, to methods for cleaning index-matching oil from preforms.

BACKGROUND OF THE INVENTION

An optical fiber preform is a cylindrical glass body from which optical fiber is made by a process known as drawing. As is described, for example, in the patent of Glantschnig et al., U.S. Pat. No. 4,934,818, granted Jun. 19, 1990, prior to drawing, it is normally necessary to determine the optical characteristics of the preform by directing a narrow monochromatic beam of light through the preform. During this testing operation, the preform is customarily submerged in a container of oil known as index-matching oil that has a refractive index that matches that of the preform.

After the optical test, the index-matching oil must be cleaned from the preform. This is a particularly crucial step if a hollow cylindrical jacket of glass is to be fitted over the preform to expand its diameter prior to drawing. The cleaning process may include detergent cleaning, followed by a water rinse. Cleaned preforms are then finally dried in hot nitrogen. The cleaning process typically takes approximately sixty minutes and generates liquid waste, which, since it includes oil and detergent, is potentially environmentally hazardous. It would be desirable to reduce the time needed for cleaning, and to reduce or eliminate liquid waste associated with cleaning. It would also be desirable if one could recycle the index-matching oil cleaned from each preform.

SUMMARY OF THE INVENTION

In accordance with an illustrative embodiment of the invention, the cleaning step comprises contacting the preform with supercritical carbon dioxide (a liquid) which dissolves residual index-matching oil on the preform. The liquefied carbon dioxide is then converted to gaseous carbon dioxide which conveniently separates the index-matching oil from the carbon dioxide so that the oil can be recovered and reused. The gaseous carbon dioxide is likewise recycled for use in subsequent cleaning, and so there is substantially no waste. Cleaning in accordance with the invention does not normally require rinsing and drying steps and is therefore faster than prior cleaning methods. These and other objects, features and benefits of the invention will be better understood from a consideration of the following detailed description taken in conjunction with the accompanying drawing.

DETAILED DESCRIPTION

Figure 1:
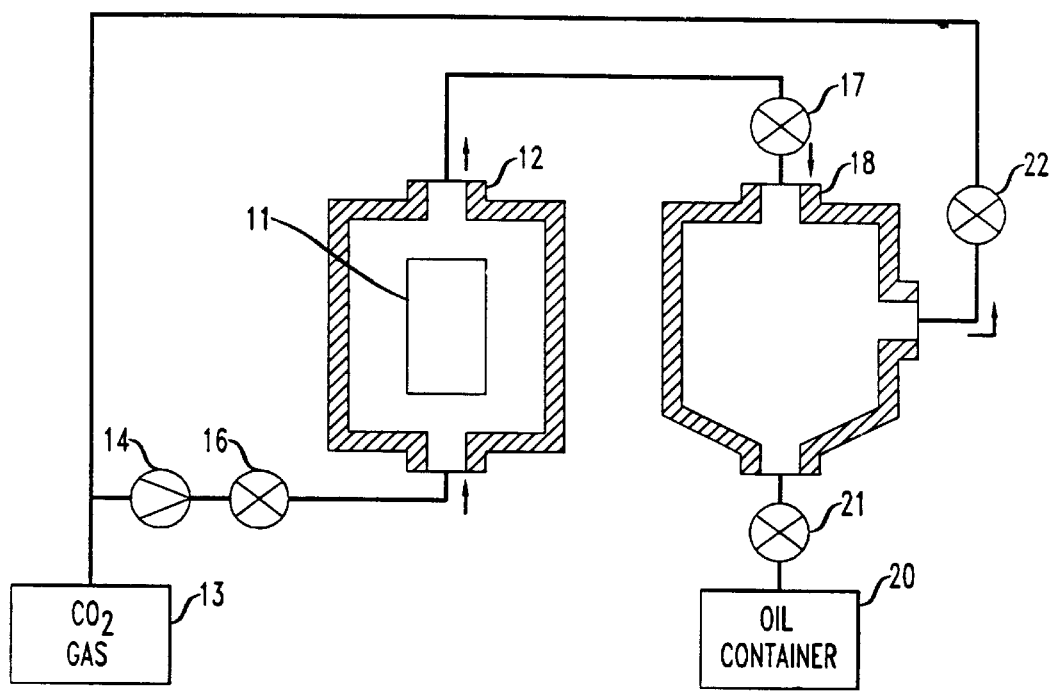
FIG. 1 is a schematic sectional view of apparatus for cleaning optical fiber preforms in accordance with an illustrative embodiment of the invention.

In the interest of clarity, the apparatus shown and described has been considerably simplified, and a number of well-known elements that would typically be used in production have been omitted.

The purpose of the apparatus is to clean an optical fiber preform 11 contained within a pressurized cleaning chamber 12. As is known, the preform has a variable refractive index gradient that is made by depositing glass soot by any of various methods, the soot being subsequently consolidated or sintered and annealed to make the glass preform. After its construction, the preform is tested by submerging it in index-matching oil and directing light through it and through the oil. After testing, the index-matching oil is cleaned from the preform in the apparatus of FIG. 1. After cleaning, one end of the preform is softened by heat so that optical fiber can be drawn from it. The various steps for making the preform 11 and for drawing optical fiber from it are well known in the art and therefore will not be explained further.

In accordance with an illustrative embodiment of the invention, a source 13 of carbon dioxide ($CO_2$) gas is directed to a compressor 14 which compresses it sufficiently to liquefy it or to put it in its supercritical state. "Supercritical" refers to a material that has been liquefied due to applied pressure at a temperature above its normal boiling point. The apparatus of FIG. 1 is kept typically at room temperature, which is higher than the normal boiling point of $CO_2$. The supercritical carbon dioxide is applied via a valve 16 to the cleaning chamber 12.

The apparatus of FIG. 1 is particularly designed to clean from the preform 11 index-matching oil, which normally comprises aliphatic and alicyclic hydrocarbons. It can be shown that such index-matching oils are highly soluble in supercritical carbon dioxide and, as a consequence, are dissolved in and carried with the flowing carbon dioxide, as shown by the arrows. In particular, the apparatus has been used to clean from preforms index-matching oil known as Immersion Liquid Code 4550, available from R. P. Cargille Labs, Cedar Grove, N.J., U.S.A.

The supercritical carbon dioxide containing the dissolved oil flows via a valve 17 to a separation chamber 18. The valve 17 may be of a type known as a reduction valve which, together with the separation chamber, reduces the pressure on the carbon dioxide and allows it to revert to its gaseous state. As a consequence of the vaporization of the carbon dioxide, the index-matching oil separates from the carbon dioxide and is collected by gravity in a container 20 via a valve 21. The gaseous carbon dioxide, in turn, is taken from an output port of the separation chamber 18 via a valve 22 and returned to the compressor 14. In this manner, the carbon dioxide is recycled for subsequent cleaning of preform 11 or other glass preforms. Likewise, the oil in container 20 is used for testing other preforms.

The basic components of the apparatus of FIG. 1 are fairly simple, the pressure for circulation of the carbon dioxide being provided by the compressor 14. The process essentially eliminates wastes and allows for recycling of both the carbon dioxide and the index-matching oil. Because the oil is highly soluble in supercritical $CO_2$, neither agitation, heat, nor unusual exposure to the fluid is required. In our experiments, preforms ten inches long, ¾ inch outer diameter, were each cleaned by a fifteen to twenty minute exposure to a flow rate of one hundred fifty pounds of supercritical $CO_2$ per hour. Such exposure gave thorough cleaning without rinsing.

It is feasible to clean each preform in about thirty minutes, which includes the steps of loading, pressurizing, cleaning, depressurizing and unloading, and which compares with the sixty minutes that is required by prior methods. It is particularly useful for cleaning known index-matching oils comprising aliphatic and alicyclic hydrocarbons, but it would also be useful for cleaning other materials that may be soluble in supercritical carbon dioxide. In production apparatus, it is expected that a number of preforms will be cleaned simultaneously in chamber 12. Various other embodiments and modifications may be made by those skilled in the art without departing from the spirit and scope of the invention.

Methods for making preforms are described in more detail in the U.S. patent of Miller et al., U.S. Pat. No. 5,039,325, granted Aug. 13, 1991, and the drawing process is described in more detail in the U.S. patent of Andrejco, U.S. Pat. No. 4,450,333, granted May 22, 1984, both hereby incorporated by reference herein.

What is claimed is:

1. A method for making optical fibers comprising the steps of:

making a first optical fiber preform;

immersing the first preform in index-matching oil;

optically testing the first preform by directing light through the oil and the preform;

removing the preform from the index-matching oil;

cleaning residual oil from the first preform comprising the steps of inserting the preform in a first chamber, and contacting the preform with supercritical-state carbon dioxide in the first chamber, thereby to dissolve said residual index-matching oil;

removing the supercritical carbon dioxide from the first chamber and directing it to a second chamber;

converting the supercritical-state carbon dioxide in the second chamber to non-supercritical gaseous carbon dioxide, thereby to separate said residual index-matching oil from the carbon dioxide;

and re-using the residual index-matching oil for optically testing a second preform that is different from the first preform;

said re-using step comprising directing light through at least part of the residual index-matching oil and the second preform.

2. The method of claim 1 wherein:

the converted gaseous carbon dioxide is recovered and compressed to make supercritical-state carbon dioxide for further use in preform cleaning.

3. The method of claim 2 further comprising the steps of:

heating both the first and second preforms and drawing optical fiber from each heated preform.

* * * * *